Jan. 5, 1954

H. D. BECK 2,664,608

TIRE CHAIN CONNECTOR

Filed July 30, 1952

Inventor
Harold D. Beck
By McCanna and Morsbach
Attys.

Patented Jan. 5, 1954

2,664,608

UNITED STATES PATENT OFFICE 2,664,608

TIRE CHAIN CONNECTOR

Harold D. Beck, Caledonia, Ill.

Application July 30, 1952, Serial No. 301,734

5 Claims. (Cl. 24—73)

1

This invention relates to anti-skid tire chains and has special reference to a connector link for connecting the cross chains to the side chains thereof.

In many portions of the country conditions are frequently encountered on the highways where the pavement is covered with ice or snow or wherein side roads are partially obstructed by snow even though main highways may be cleared. The tire chains commonly used for the purpose of providing wheel traction are subject to extreme wear, particularly under modern conditions where main concrete highways may be fairly well cleared of ice while the secondary roads may still have snow, necessitating the use of chains which must under these circumstances be subjected to severe wear against the clear highways. With such wear the cross chains become thin and ultimately break somewhere near their mid point, leaving their free ends to pound against the vehicle as the wheel turns. With heavy vehicles such as trucks and buses the cross chains are of substantial size and weight and cannot be permitted to strike against the body for more than a very minimum of time because of the damage occasioned by the impact. With tire chain constructions of the prior art, removal of the cross link or its repair requires the use of special heavy duty tools, and consequently it is normally necessary that the chains be taken to a service station for repair. Therefore, when such breakage occurs, it is necessary that the operator of the vehicle either remove the chain and proceed without it, or to have spare chains for replacement.

The principal object of the invention is the provision of a connector link for connecting the cross chains to the side chains so constructed as to be replaceable without the use of special tools, capable of repeated re-use, and so constructed that the cross chains may be replaced quickly and conveniently on the highway.

Figure 2:
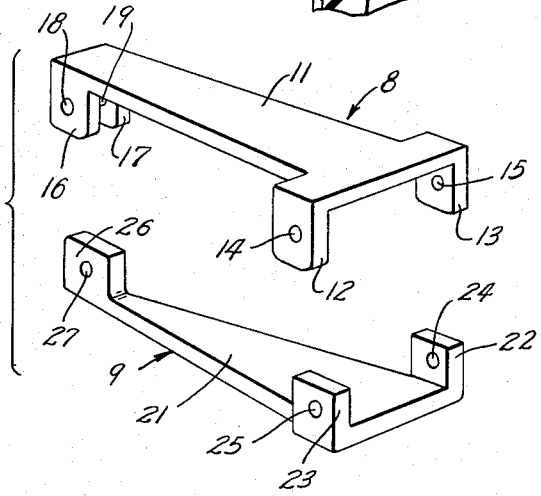
Fig. 2 is an expanded view showing the parts of the connector.
Figure 3:
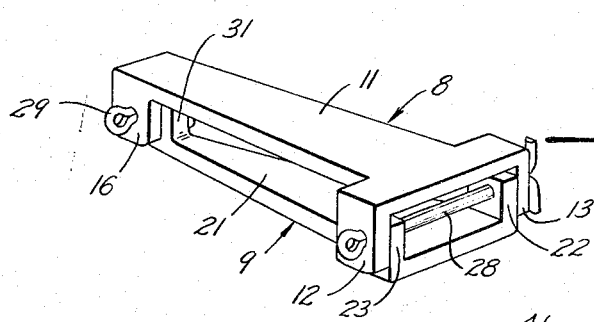
Fig. 3 is a perspective view showing the parts of the connector assembled separate from the chain.

The numeral 4 indicates generally a conventional automotive tire, in this instance indicating a pneumatic tire such as commonly used on trucks, buses and the like, to which is attached an anti-skid chain of the usual type having side chains such as indicated at 5 disposed on opposite sides of the tire and pulled snug in the usual manner so as to rest against the side of the tire casing. 6 indicates a conventional cross chain of the type used for interconnecting the side chains at intervals about the periphery of the casing, the cross chains extending across the tread 7 of the casing to provide additional traction for the wheel in the well known manner. According to the invention, the ends of the cross chains 6 are connected to the side chains by a connector link shown separately in Figs. 2 and 3.

The connector links comprise two plates indicated at 8 and 9 adapted to form the side members of the connector link. These side members are in this instance formed of sheet metal, though they may take a number of specific forms and shapes. The side member 8 has a central body portion 11 provided at one end with widely spaced ears 12 and 13 extending outwardly from the body, the ears 12 and 13 having aligned apertures 14 and 15. The opposite end of the side member 8 has closely spaced depending ears 16 and 17 extending from the same side of the body member, these ears also having aligned apertures 18 and 19.

The side member 9 likewise includes a body portion 21 having widely spaced upstanding ears 22 and 23 provided with aligned apertures 24 and 25, while the opposite end of the body member has an upstanding ear 26 provided with an aperture 27.

The ears 12 and 13 are spaced apart a distance slightly greater than the ears 22 and 23 so that the side members of the link can be assembled with the ears 12 and 13 in face to face contact with the ears 22 and 23 and the apertures of the two sets of ears in alignment for the reception of a pin 28, in this instance shown as an ordinary cotter pin, though any suitable pin or connecting member may be employed. When thus assembled, the ear 26 is received between the ears 16 and 17 and substantially in face to face contact therewith, the apertures 18, 19 and 27 being in alignment for the reception of a pin 29. Preferably the ear 26 is slightly greater in width than the ears 18 and 19 so as to project inwardly therefrom a slight distance as indicated at 31.

Figure 1:
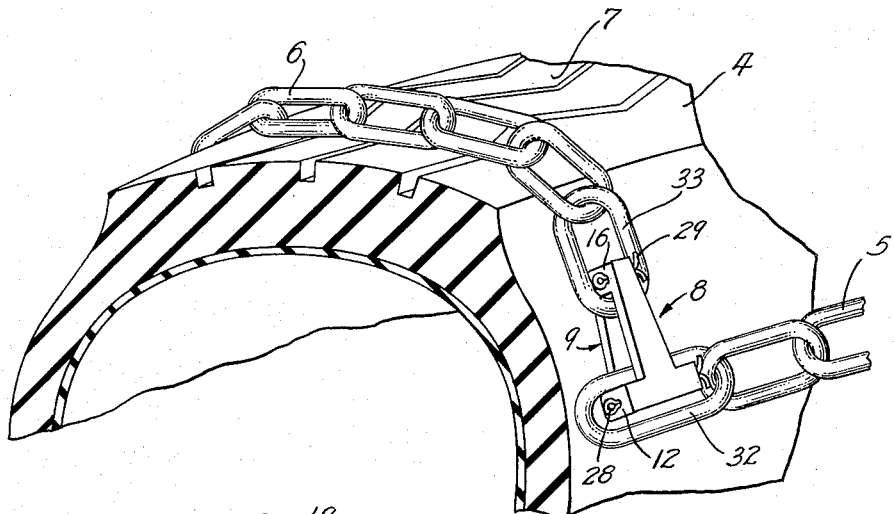
Figure 1 is a fragmentary perspective view showing the connector in position in a tire chain applied to a tire.

In use, the connector link is employed in the tire chain in the manner shown in Figure 1, the ears 12, 13, 22 and 23 being received in a link 32 of the side chain, and the ears 16, 17 and 26 being received in the end link 33 of the cross chain. It will be seen that the ears 12, 13, 22 and 23 being widely spaced, provide a firm bearing against the side portion of the link 32, whereas the ears 16, 17 and 26 provide a substantially narrower bearing so as to be receivable against the end of the cross link 32. The projecting portion 31 of the ear 26 brings this ear into bearing relationship with the end of the link despite the curvature of the cross link.

It will be seen that this side members 8 and 9 have flat exposed opposite sides which are adapted to bear against the side wall of the tire and give a flat smooth bearing thereagainst. This materially reduces the amount of scuffing commonly occasioned on the walls of the casing as the cross links moves back and forth with rotation of the wheel, and the link does not bite into the casing when the load is applied to the cross link as is common in the prior art constructions. It will also be noted that the ears 12, 13, 22 and 23 provide widely spaced bearings against the link 32, thereby minimizing the tendency of this link to be stretched or distorted under heavy load. An important advantage of the construction is the fact that new cross links may be substituted in a chain with ease and speed by means of the tools commonly found in a truck or bus. Should the cross chain 6 break, it only becomes necessary for the user to withdraw the cotter pin 29, spread the side members 8 and 9 slightly and remove the portion of the old cross chain. The end of the new cross chain may then be slipped into place, the side members returned to their operating position, and the cotter pin re-inserted. Normally it is not even necessary to remove the chain from the wheel.

I claim:

1. A connector for connecting tire cross chains to the side chains of tire chains comprising two interfitting plate members arranged in superimposed spaced relationship having approximately flat exposed remote sides upstanding interfitting ears on the near sides of the plate members adjacent opposite ends thereof for spacing the plates, the ears at one end being dimensioned for reception within a link of a side chain and the ears at the opposite end being dimensioned for reception within a link of a cross chain and pins extending through the ears at each end of the plates for holding the plates together.

2. A connector for anti-skid tire chains comprising two interfitting plates each having an approximately flat outer side, each plate having ears adjacent its ends projecting from the other side of the plates adapted to interfit with ears of the other plate to space the plates, the interfitting ears at one end of the plates being shaped and positioned for reception within the link of a side chain and the interfitting ears at the opposite end of the plates being shaped and positioned for reception in the end link of a cross chain, and pins passing through the ears at opposite ends to hold the plates together.

3. A connector for anti-skid tire chains comprising two plates arranged in superimposed relationship and forming the side members of the connector, the outer exposed side of at least one of the plates being approximately flat to rest against the side wall of a pneumatic tire, upstanding ears arranged at the ends of each plate, the ears of the plates being shaped and spaced to interfit to form the end members of the connector and acting to space the plates, the interfitting ears at one end of the plates being widely spaced for reception within the link of a side chain to bear against the side portion of the link, and the interfitting ears at the opposite end of the plates being disposed in overlapping face to face relation for reception in the end link of a cross chain to bear against the end of the link, and pins passing through the ears at each end of the connector for securing the plates together.

4. A connector for anti-skid tire chains comprising two approximately T-shaped plates arranged in superimposed relationship and forming the side members of the connector, the outer exposed side of at least one of the plates being approximately flat to rest with a minimum of wear against the side wall of a pneumatic tire, upstanding ears projecting from each plate in the same direction at each of three ends of the T formation, the ears of the two plates being positioned in interfit and space the plates for reception of the ears into links of the tire chain, and pins passing through the ears at each end of the connector.

5. A connector for tire cross chains comprising an elongated plate having a flat exposed side, the opposite side thereof having a pair of widely spaced upstanding apertured ears adjacent one end of the plate and a pair of closely spaced upstanding apertured ears adjacent the other end thereof, a second plate having a flat exposed side, the opposite side having a pair of widely spaced apertured ears adjacent one end spaced to rest in face to face contact with the widely spaced ears on the first plate within a link of the annular side chain of an anti-skid tire chain, a pin passing through the apertures in the widely spaced ears, the second plate having an apertured upstanding ear adjacent its opposite end for reception between the closely spaced ears of the first plate within the end link of a cross chain, and a pin passing through the apertures of the closely spaced ears and the last mentioned ear to secure the cross chain to the annular chain.

HAROLD D. BECK.

No references cited.